US010922322B2

(12) United States Patent
Kleindienst et al.

(10) Patent No.: US 10,922,322 B2
(45) Date of Patent: Feb. 16, 2021

(54) SYSTEMS AND METHODS FOR SPEECH-BASED SEARCHING OF CONTENT REPOSITORIES

(71) Applicant: Nuance Communications, Inc., Burlington, MA (US)

(72) Inventors: Jan Kleindienst, Nove Straseci (CZ); Ladislav Kunc, Hlusice (CZ); Martin Labsky, Prague (CZ); Tomas Macek, Prague (CZ)

(73) Assignee: Nuance Communications, Inc., Burlington, MA (US)

( * ) Notice: Subject to any disclaimer, the term of this patent is extended or adjusted under 35 U.S.C. 154(b) by 396 days.

(21) Appl. No.: 15/323,628

(22) PCT Filed: Jul. 22, 2014

(86) PCT No.: PCT/US2014/047544
§ 371 (c)(1),
(2) Date: Jan. 3, 2017

(87) PCT Pub. No.: WO2016/014026
PCT Pub. Date: Jan. 28, 2016

(65) Prior Publication Data
US 2017/0147585 A1    May 25, 2017

(51) Int. Cl.
*G06F 15/16*    (2006.01)
*G06F 16/2457*    (2019.01)
(Continued)

(52) U.S. Cl.
CPC .... *G06F 16/24578* (2019.01); *G06F 16/2455* (2019.01); *G06F 16/334* (2019.01);
(Continued)

(58) Field of Classification Search
CPC combination set(s) only.
See application file for complete search history.

(56) References Cited

U.S. PATENT DOCUMENTS

| | | | | | |
|---|---|---|---|---|---|
| 5,596,679 | A | * | 1/1997 | Wang | G10L 15/08 704/232 |
| 2002/0193991 | A1 | * | 12/2002 | Bennett | G10L 15/08 704/247 |

(Continued)

FOREIGN PATENT DOCUMENTS

| CN | 101223572 A | 7/2008 |
|---|---|---|
| CN | 101636935 A | 1/2010 |
| CN | 101636935 B | 1/2013 |

OTHER PUBLICATIONS

"Integrating Keywords and Semantics on Document Annotation and Search" by Nikos Bikakis (Year: 2017).*

(Continued)

*Primary Examiner* — Alex Gofman
(74) *Attorney, Agent, or Firm* — Wolf, Greenfield & Sacks, P.C.

(57) ABSTRACT

According to some aspects, a method of searching for content in response to a user voice query is provided. The method may comprise receiving the user voice query, performing speech recognition to generate N best speech recognition results comprising a first speech recognition result, performing a supervised search of at least one content repository to identify one or more supervised search results using one or more classifiers that classify the first speech recognition result into at least one class that identifies previously classified content in the at least one content repository, performing an unsupervised search of the at least one content repository to identify one or more unsupervised search results, wherein performing the unsupervised search comprises performing a word search of the at least one content repository, and generating combined results from among the one or more supervised search results and the one or more unsupervised search results.

20 Claims, 8 Drawing Sheets

(51) Int. Cl.
  *G06N 20/00* (2019.01)
  *G06F 16/2455* (2019.01)
  *G06F 16/36* (2019.01)
  *G06F 16/33* (2019.01)
  *G10L 15/22* (2006.01)

(52) U.S. Cl.
  CPC ........... *G06F 16/367* (2019.01); *G06N 20/00* (2019.01); *G10L 15/22* (2013.01); *G10L 2015/223* (2013.01)

(56) References Cited

U.S. PATENT DOCUMENTS

| | | | | |
|---|---|---|---|---|
| 2014/0250115 A1* | 9/2014 | Yang | ........................ | G06F 16/58 707/728 |
| 2014/0278390 A1* | 9/2014 | Kingsbury | .......... | G10L 15/1822 704/232 |
| 2016/0275950 A1* | 9/2016 | Ogawa | .................... | G10L 15/10 |

OTHER PUBLICATIONS

International Search Report and Written Opinion for International Application No. PCT/US2014/047544 dated Dec. 22, 2014.
International Preliminary Report on Patentability for International Application No. PCT/US2014/047544 dated Feb. 2, 2017.
Bhagdev et al., Hybrid Search: Effectively Combining Keywords and Semantic Searches. The Semantic Web: Research and Applications. Springer 2007. 15 pages.
Bikakis et al., Integrating Keywords and Semantics on Document Annotation and Search. On the Move to Meaningful Internet Systems. OTM 2010. 18 pages.
Dumais, Improving the Retrieval of Information from External Sources. Behavior Research Methods, Instruments and Computers, Psychonomic Society 1991;23(2):223-36.
Labsky et al., Recipes for Building voice search UIs for Automotive. 14$^{th}$ Conference of the European Chapter of the Association for Computational Linguistics. Proceedings of the Workshop on Dialogue in Motion (DM). 2014. 15 pages.

* cited by examiner

HEADLIGHT SWITCH
Automatic Headlights/Fog Lights
- Rotate the headlight switch, located to the left of the steering wheel, to the first position marked "A" for automatic headlights.
- Rotate the headlight switch to the second position to turn on parking lights.
- Rotate the headlight switch to the third position to turn on headlights.
- Push the headlight switch to turn on or off the fog lights.
- Refer to your Owner's manual on the DVD for further details.

110

102

Q) How do I turn on the fog lights?
A) Push the headlight switch located to the left of the steering wheel.

Q) How do I open the hood of my car?
A) Ensure the engine is turned off and the parking brake is on. Find the hood release under the steering wheel and press the button.

121

122

100

SYSTEMS AND METHODS FOR SPEECH-BASED SEARCHING OF CONTENT REPOSITORIES

CROSS REFERENCE TO RELATED APPLICATIONS

This patent application is a national phase filing under 35 U.S.C. § 371 of International Application No. PCT/US2014/047544, titled "Systems and Methods for Speech-Based Searching of Content Repositories," filed Jul. 22, 2014, which is incorporated herein by reference in its entirety.

BACKGROUND

Users may search for content within a content repository by providing a search query, such as a typed or spoken search query, and in response receive a list of items of content (sometimes called "articles") that relate to the search query. In some systems, the list of articles (also sometimes called "search results") may be identified by a classifier that has been trained to associate queries with relevant articles in the content repository. On the basis of the prior training, a classifier may classify a new query as being related to particular content by identifying one or more articles relating to the query.

SUMMARY

Some embodiments include a method of searching for content in at least one content repository in response to a user voice query, the method comprising acts of receiving the user voice query, performing speech recognition on the user voice query to generate N best speech recognition results for the user voice query, wherein N is equal to one or more, and wherein the N best speech recognition results comprise a first speech recognition result, performing a supervised search of the at least one content repository to identify a set of one or more supervised search results, wherein each one of the one or more supervised search results is associated with a score indicative of a predicted relevance of the one of the one or more supervised search results to the user voice query, wherein performing the supervised search comprises processing the first speech recognition result using one or more classifiers that classify the first speech recognition result into at least one class that identifies previously classified content in the at least one content repository, performing an unsupervised search of the at least one content repository to identify a set of one or more unsupervised search results, wherein each one of the one or more unsupervised search results is associated with a score indicative of a predicted relevance of the one of the one or more unsupervised search results to the user voice query, wherein performing the unsupervised search comprises performing a word search of the at least one content repository using one or more words derived from the first speech recognition result, and generating a set of combined results from among the set of one or more supervised search results and the set of one or more unsupervised search results.

Some embodiments provide an apparatus comprising at least one processor, and at least one storage medium storing processor-executable instructions that, when executed by the at least one processor, perform a method of searching for content in at least one content repository in response to a user voice query, the method comprising acts of receiving the user voice query, performing speech recognition on the user voice query to generate N best speech recognition results for the user voice query, wherein N is equal to one or more, and wherein the N best speech recognition results comprise a first speech recognition result, performing a supervised search of the at least one content repository to identify a set of one or more supervised search results, wherein each one of the one or more supervised search results is associated with a score indicative of a predicted relevance of the one of the one or more supervised search results to the user voice query, wherein performing the supervised search comprises processing the first speech recognition result using one or more classifiers that classify the first speech recognition result into at least one class that identifies previously classified content in the at least one content repository, performing an unsupervised search of the at least one content repository to identify a set of one or more unsupervised search results, wherein each one of the one or more unsupervised search results is associated with a score indicative of a predicted relevance of the one of the one or more unsupervised search results to the user voice query, wherein performing the unsupervised search comprises performing a word search of the at least one content repository using one or more words derived from the first speech recognition result, and generating a set of combined results from among the set of one or more supervised search results and the set of one or more unsupervised search results.

Some embodiments provide at least one computer-readable medium storing computer-executable instructions that, when executed, perform a method of searching for content in at least one content repository in response to a user voice query, the method comprising acts of receiving the user voice query, performing speech recognition on the user voice query to generate N best speech recognition results for the user voice query, wherein N is equal to one or more, and wherein the N best speech recognition results comprise a first speech recognition result, performing a supervised search of the at least one content repository to identify a set of one or more supervised search results, wherein each one of the one or more supervised search results is associated with a score indicative of a predicted relevance of the one of the one or more supervised search results to the user voice query, wherein performing the supervised search comprises processing the first speech recognition result using one or more classifiers that classify the first speech recognition result into at least one class that identifies previously classified content in the at least one content repository, performing an unsupervised search of the at least one content repository to identify a set of one or more unsupervised search results, wherein each one of the one or more unsupervised search results is associated with a score indicative of a predicted relevance of the one of the one or more unsupervised search results to the user voice query, wherein performing the unsupervised search comprises performing a word search of the at least one content repository using one or more words derived from the first speech recognition result, and generating a set of combined results from among the set of one or more supervised search results and the set of one or more unsupervised search results.

The foregoing summary is provided by way of illustration and is not intended to be limiting.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 1 depicts an illustrative content repository storing content relating to the operation of a motor vehicle, in accordance with some embodiments;

DETAILED DESCRIPTION

Figure 2:
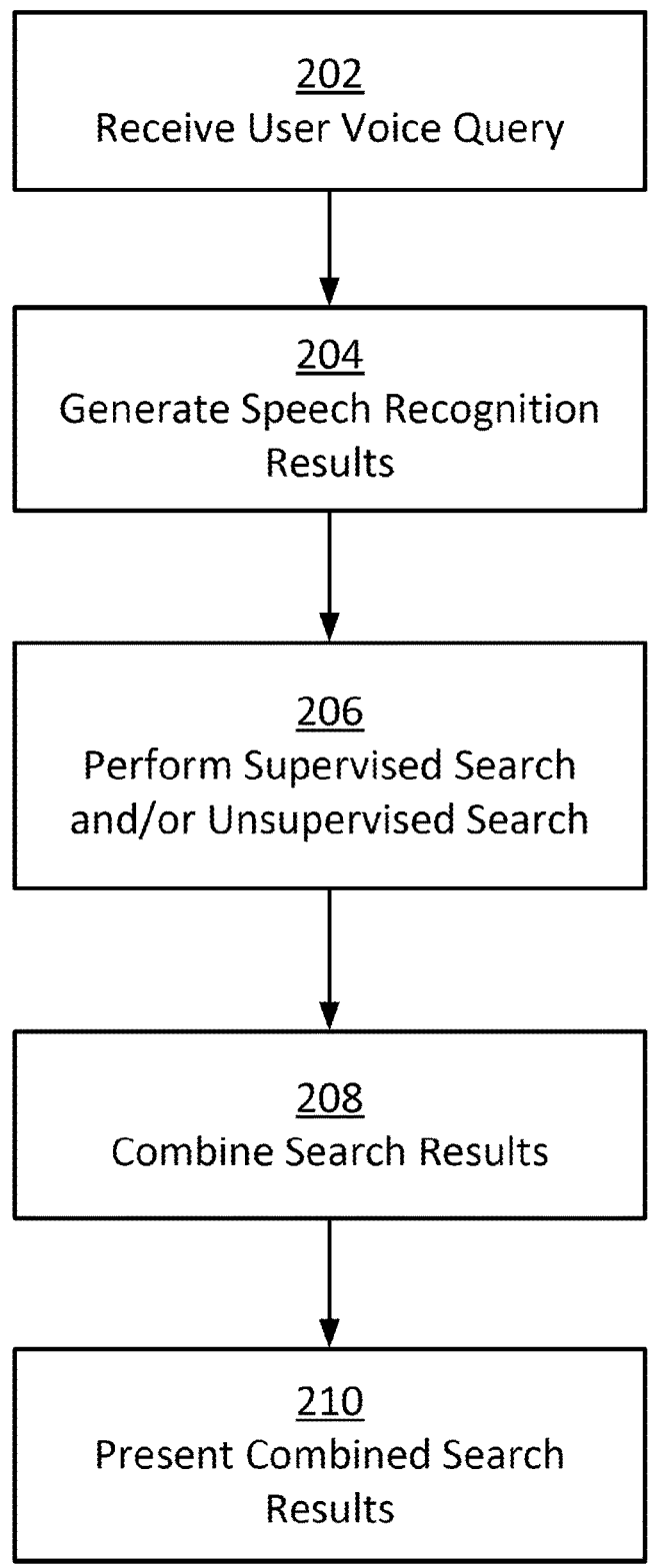
FIG. 2 is a flow chart of an illustrative process that performs supervised and/or unsupervised searching of a content repository, in accordance with some embodiments.

As discussed above, a classifier may be trained to classify queries as being related to one or more known articles in a content repository. This training is conventionally done using a large set of training data, which may comprise sample input queries, each having one or more hand coded (i.e., by a person) results identifying content in the repository related to the query. Once trained, the classifier may subsequently classify a new query as being related to content (sometimes referred to as "supervised search"). In addition, a classifier is only effective at classifying input queries as related to content that the classifier has been trained for so that, if new content is added to a repository it cannot be identified by a classifier as relevant to an input query unless the classifier is retrained with training data including the new content.

The inventors have recognized and appreciated that effective classification of new queries is influenced by the amount of training data used to train the classifier, with effective classification typically requiring large volumes of training data. To perform a supervised search of all the content in a content repository and obtain accurate search results, for example, a classifier must have previously been trained on all of the content in the content repository. A classifier may alternatively be trained on only a portion of the content in the content repository, but this may limit search results to content from only that portion of the content repository, thereby limiting the information available to a user.

The inventors have recognized and appreciated that beneficial results can be achieved by searching a content repository using both supervised and unsupervised techniques (i.e., techniques that do not employ a trained classifier). For example, unsupervised searching may include keyword searching and/or statistical techniques to identify patterns in content, and may be used to identify one or more articles from a content repository as being related to a search query. Some illustrative unsupervised searching techniques are described below.

In some embodiments, a "hybrid" approach of using both supervised and unsupervised search techniques allows for training of a classifier to recognize fewer articles than would be employed with a supervised-only approach. A classifier may be trained on a selected portion of articles in a content repository, and a search using the hybrid approach may be performed. The hybrid search may identify one or more of the selected articles by supervised classification and may additionally identify articles (which may include the selected, non-selected articles and/or articles added to the repository after the training of the classifier) using unsupervised searching. In some cases, therefore, all articles in a content repository may be searched even though only a selected portion of those articles were identified when training a supervised classifier.

In other embodiments, the hybrid approach may allow for training of a classifier using less training data (e.g., fewer training queries) compared with the supervised-only approach discussed above. Generally speaking, supervised classification of content has an accuracy (e.g., an effectiveness of correctly matching new queries to content) that increases as the number of training instances (e.g., exemplary queries) used to train the classifier increases. To obtain a particular accuracy from a classifier using a supervised-only approach, a particular volume of training data may be needed. Using a hybrid approach may allow for the same (or better) desired accuracy using a reduced training data set, because the unsupervised search of the content repository may produce additional search results that may, at least in part, compensate for any reduction in accuracy of the classifier due to the reduction in size of the training data set.

According to some embodiments, a search of a content repository using a search query may be performed by combining search results from a supervised search of the content repository using the search query with search results produced from an unsupervised search of the content repository using the search query. Search results may be merged or otherwise combined to produce a single set of search results, which may be presented to a user or processed in any other suitable way. In one embodiment, an order in which the search results are presented may be based, at least in part, on one or more scores associated with each search result. For example, the two sets of search results may be combined to produce a single set of search results in descending or ascending order based on one or more scores (e.g., a confidence score produced by a classifier) associated with each of the search results. However, aspects of the present invention described herein are not limited in this respect, as any suitable technique(s) for combining search results may be used.

In some embodiments, a speech recognition result is determined based on a user speech input and is used to perform both unsupervised and supervised searches of a content repository. The speech recognition result may be, for example, one of an N best list produced by performing speech recognition on the user speech input. One or more search results produced by each of the supervised and unsupervised searches based on the speech recognition result may be combined into a set of search results. In some embodiments, a plurality of speech recognition results representing different hypotheses for the user speech input may all be used to perform supervised and unsupervised searches of the content repository, and the search results may then be combined to produce a set of search results.

In some embodiments, a speech recognition result determined based on a user speech input may be classified as a candidate for supervised searching, a candidate for unsupervised searching, or both. A speech recognition result may be classified into one of these classes using a classifier that was previously trained to identify the type of content based on a speech recognition result. For example, if the supervised search is performed by a classifier that classifies input into one of a relatively small number of classes of content, then a first stage classifier that identifies a query as not being related to one of these classes may result in the input not being used to perform a supervised search, given that a supervised search is unlikely to return relevant results. Once classified, the speech recognition result may be used in the manner specified by the classification to produce one or more search results from a supervised search, an unsupervised search, or both. A plurality of speech recognition results may be used to produce search results in this way, and those search results may be combined to produce a set of search results, which may include search results from both supervised and unsupervised searches. In some embodiments, using a classifier to classify a speech recognition result for use with supervised search, unsupervised search or both may reduce the number of unsupervised and/or supervised searches performed based on the speech recognition result by selecting one type of search or another based on the speech recognition result prior to performing a search.

As discussed above, some embodiments relate to classification of a query, such as a speech recognition result, using a trained classifier. The techniques described herein are not limited to use with any particular classifier technique and may, for example, use a logistic regression classifier, support vector machine (SVM) classifier, an exponential family model classifier, or any other suitable type of classifier. Aspects of the present invention described herein are not limited to any particular implementations of classifiers, and can be used with any suitable classifier.

As discussed above, some embodiments relate to unsupervised searching of content. Unsupervised searching may include any suitable unsupervised techniques, non-limiting examples of which include term frequency-inverse document frequency (TF/IDF), Okapi BM25, vector space model, PageRank, and keyword searching. Aspects of the present invention described herein are not limited to any particular unsupervised techniques, and can be used with any suitable unsupervised technique.

A content repository as described herein may include any suitable collection of digital content, including but not limited to one or more document data files, one or more relational databases and/or one or more non-transitory data streams or flows, any one or more of which may store any type of content, including but not limited to text/document, audio, and/or video content. An article stored by a content repository may include any number of types of content, including those described above, and may be stored in any suitable way.

In some embodiments, the classifier is trained to classify inputs into classes that represent commonly requested content. For example, a classifier for supervised searches in the hybrid approach described herein may be trained to classify input to identify articles describing solutions to common problems and/or answers to commonly asked questions. Search results may thereby be provided by using the classifier trained to identify one of the selected articles based on a corresponding query. In some embodiments, search results may additionally be produced based on an unsupervised search of the remaining content.

In some embodiments, one or more words in a search query (e.g., in a speech recognition result) may be used to access an ontology comprising a hierarchy of related words and/or phrases. A search query may be supplemented based on words and/or phrases identified by the ontology as being related to the words in the query, for example, by incorporating the one or more associated elements from the ontology into a search query (e.g., by adding the words to the query). The search space of a query may thereby be expanded using the associated elements. For example, an element "phone" may be associated in an ontology with the elements "telephone" and "mobile." A search query "How do I turn off my phone?" may be supplemented by the ontology to generate a search query that additionally includes the words "telephone" and/or "mobile." A search may then be performed based on the supplemented query, which may search a greater portion of the content repository than the non-supplemented query.

In some embodiments, one or more search results are presented to a user via a user interface (e.g., via a display and/or via synthesized speech). Any articles identified as a search result may be presented using a user interface in any suitable way. In one embodiment, titles or abstracts or some other shorthanded identifier of multiple search results may be provided and the user may select one or more results that the user desires be presented in full. In some embodiments, multiple modalities are used. For example, a title of an article identified as a search result may be provided by speech and the body of the article may be provided via a display. Alternatively, or additionally, an entire article represented by a search result (e.g., a highest scoring result) may be provided to a user via speech synthesis. However, aspects of the present invention described herein are not limited to any particular technique(s) for presenting search results and/or content identified by the search results, and can be used with any suitable presentation technique(s).

As discussed above, a classifier may be trained to classify inputs into classes relating to a portion of content in a content repository. The portion of content may then be subsequently searched in a supervised search (i.e., using the trained classifier and/or via unsupervised search) based on new queries, while another portion of content in the content repository may be searched only via unsupervised searches. FIG. 1 illustrates an illustrative content repository that includes two portions of content, one available for supervised (and optionally unsupervised) search and another available only for unsupervised searches.

FIG. 1 depicts an illustrative embodiment in which a content repository stores content relating to the operation of a motor vehicle. Content repository 100 stores content portion 101, which includes illustrative article 110, and content portion 102, which includes illustrative articles 121 and 122. Content portion 101, which comprises illustrative article 110, depicts content that may typically be found in the body of a motor vehicle owner's manual, whereas content portion 102, which comprises illustrative articles 121 and 122, is provided in a question/answer format of the type that may be created as supplemental material for an owner's manual. Articles 110, 121 and 122 may be stored in any suitable format(s) in content repository 100, such as text and/or audio. In the example of FIG. 1, a classifier may have been trained to associate queries with articles of content portion 102, such that a search of content repository 100 using the hybrid approach described herein may perform an unsupervised search of content portion 101 and/or may perform a supervised (and optionally also unsupervised) search of content portion 102.

In the example of FIG. 1, the questions/answer format of content portion 102 may facilitate a trained classifier in acceptably identifying a relevant question/answer pair, such as articles 121 and/or 122, based on a query to identify content that concisely addresses a problem encountered by a user.

In contrast, article 110 may require careful parsing by a user to identify the desired information (e.g., how to turn on the fog lights). Not only does article 110 include extraneous information not directly related to the particular problem of how to turn on the fog lights, but important contextual information, namely where the "headlight switch" is located, is not provided in proximity to the text that indicates how to activate the headlight switch to turn on the fog lights. Thus, while a search of article 110 may ultimately provide helpful information, a user may need to work harder to determine this information compared with accessing article 121, since the user must access multiple sections of the content and synthesize the information in those sections to determine the desired information.

As discussed above, the inventors have recognized and appreciated that while content 102 may have certain advantages when available, the scope of this content may be limited. Accordingly, while aspects of content portion 102, such as the brevity of the question/answer format, may provide advantages over content portion 101 when used in a content repository for searching, these advantages remain limited to the particular content provided in content portion 102. Information that may be present in content portion 101, such as how to turn on the parking lights, for example, may not be present in content portion 102. As discussed above, training a classifier to perform a supervised search of this material (e.g., the entire user's manual) may require significantly more training data than training the classifier just for content portion 102 training data. If, instead, an unsupervised search of content portion 101 is performed in addition to the supervised search of content portion 102, the content (e.g., how to turn on the parking lights) may be provided as a search result without it being necessary to obtain the training data that would have been necessary to train the classifier to search content portion 101.

In addition, in the example of FIG. 1, it may be inconvenient to present article 110 due to its length, whereas article 121 is more concise. For example, a user may find it difficult to recall relevant information when presented with article 110 (e.g., by reading or listening to the content) because the information the user is searching for (e.g., how to turn on the fog lights) may be spread out over a longer presentation than in article 121. A concise presentation such as article 121 may thereby provide a particular advantage for situations and/or applications in which it is inconvenient or difficult for a user to be reading content (or listening to content, etc.) from a content repository. For example, a driver of a motor vehicle may wish to learn about the operation of the vehicle while driving. Content such as article 121 may provide a prompt way for the driver to learn how to operate a feature of the vehicle during operation, such as how to turn on the fog lights.

In some embodiments, a user voice query is received and one or more speech recognition results generated from the user voice query are used to perform supervised and/or supervised searching of a content repository. FIG. 2 is a flow chart of one non-limiting illustrative process 200 that performs supervised and/or unsupervised searching of a content repository and combines results of the searching. Process 200 may be performed by any suitable device, an example of which is discussed in relation to FIG. 8 below.

In act 202 a user voice query is received. The user voice query may comprise audio data and may be received in any suitable way. For example, a microphone or other audio capture device may receive speech and generate audio data from the speech. Alternatively, or additionally, a data file comprising audio data may be supplied (e.g., if the computer (s) on which the process 200 is executed is different from a computer that has a microphone to receive voice input). However, these are non-limiting examples, as any technique for receiving a user voice query may be used.

In act 204, speech recognition results are generated based on the user voice query. The generation may be performed by an automatic speech recognition (ASR) engine. For example, ASR may be performed on the user voice query and an N best list of speech recognition results may be generated. In some embodiments, one or more of the speech recognition results are associated with a score indicative of a predicted relevance of the speech recognition result. For example, each result of an N best list of speech recognition results generated via ASR may be associated with a confidence score, which may be produced by the ASR process.

In act 206, one or more supervised and/or unsupervised searches of the content repository are performed using one or more of the speech recognition results generated in act 204. The one or more supervised and/or unsupervised searches may produce one or more search results that comprise information identifying content in the content repository. For example, a search result may comprise an identifier identifying associated content, a link to associated content, a title of associated content, a summary of associated content, a portion of associated content, or any other suitable information that identifies content in the repository.

Any one or more of the speech recognition results generated in act 204 may be used as a search query to perform a supervised and/or an unsupervised search using the speech recognition result. As discussed above, in some embodiments a speech recognition result may be used to perform both a supervised and an unsupervised search of the content repository, whereas in other embodiments a speech recognition result may be used to perform either a supervised or an unsupervised search of the content repository. Any supervised and/or unsupervised searches performed in act 206 may search a portion or all of the content repository.

In some embodiments, a search query may be supplemented by identifying one or more words in a speech recognition result as corresponding with one or more elements in an ontology and the unsupervised and/or supervised searches performed may be based on one or more supplemented search queries in act 206. Examples of generating supplemented search queries based on an ontology are discussed below in relation to FIG. 7.

According to some embodiments, supervised classification performed in act 206 may search a portion of the content repository. As discussed above, a classifier may be trained to classify inputs as relevant to content in a portion of a content repository, and subsequent classification of queries using the classifier may provide search results from that portion. For example, in the illustrative content repository depicted in FIG. 1, a classifier may have been trained on content portion 102 and subsequent supervised classification of queries may identify content, such as content 121 or 122, within content portion 102.

According to some embodiments, an unsupervised search performed in act 206 may search all of the content repository. In other embodiments, an unsupervised search may be limited to searching only a portion of the content repository. For example, in the illustrative content repository depicted in FIG. 1, an unsupervised search may be performed only on content that is not classified by a classifier and subject to supervised search (e.g., content portion 101).

Irrespective of how the content repository is searched, one or more search results may be produced by the supervised and/or unsupervised searches. In some embodiments, the one or more search results are assigned associated scores that indicate a predicted relevance of a corresponding search result. For example, where a first search result is judged to be more relevant to a search query than a second search result, the first search result may be associated with a score higher than a score associated with the second search result. In some embodiments, one or more scores associated with one or more respective search results are normalized. For example, the one or more scores may be scaled, translated and/or otherwise transformed by one or more mathematical operation(s), such that the sum of the one or more scores is equal to a particular value (such as 1). This may have a benefit of allowing an accurate comparison between the potential relevance of search results produced in different ways (e.g., by unsupervised versus supervised searches, queries that use different ASR results, queries that use (or not) different elements from the ontology, etc.).

In act 208, search results produced by one or more supervised and/or unsupervised searches performed in act 206 may be combined. As discussed above, act 206 may comprise one or more supervised and/or unsupervised searches of the content repository, and each search may produce one or more search results. Search results produced by act 206 may be combined in act 208 using any suitable technique(s). In some embodiments, one or more scores associated with one or more search results are used to produce a combined set of search results, such as by ordering the set of search results based at least in part on the one or more scores. For example, as discussed above, speech recognition results generated in act 204 may be associated with a confidence score for each result and/or search results produced by a supervised or unsupervised search may be associated with an additional score (e.g., a normalized score). Any one or more of these scores may be used, at least in part, to determine an order of the combined set of search results.

In some use cases, one or more search results may identify the same content in the content repository. For example, supervised searches based on two different search queries may identify the same search result, and/or an unsupervised search and a supervised search based on the same search query may identify the same search result. In such cases, duplicate search results may be excluded or removed from the combined list of search results, such as when performing the combining step in act 208. Where one or more scores are associated with duplicate search results (e.g., any of the scores as discussed above), either of the scores, or a value based on combining the scores, may be used for the duplicated search result. For example, the highest score of the plurality of duplicate search results may be retained, or an average value of the plurality of scores may be used when combining the search results.

In act 210, one or more search results of the combined set of search results determined in act 208 may be presented. Search results may be presented in any suitable way, including via one or more displays and/or by voice, as aspects of the invention described herein are not limited to any particular presentation technique(s). A search result may be presented with any suitable portion of content associated with the search result in act 210. For example, a search result may be presented with aspects of an article (e.g., a title and/or a summary) associated with the search result. Furthermore, user input may be provided to a system implementing process 200 that causes the system to adjust one or more aspects of the presentation of search results. As one non-limiting example of presentation of search results, the search results may be presented by displaying titles of articles associated with the search results on a display. Upon selection of one of the articles (e.g., via a voice command, a touch input to the display, or in any other suitable way), the article may be presented by voice (e.g., by performing text-to-speech of text in the article).

FIGS. 3-6, described in further detail below, depict non-limiting examples of techniques for performing some or all of the acts described in FIG. 2. The below examples may be implemented in any suitable way and are not limited to any particular implementation techniques (e.g., for classification of content or performing unsupervised searching of content).

Figure 3:
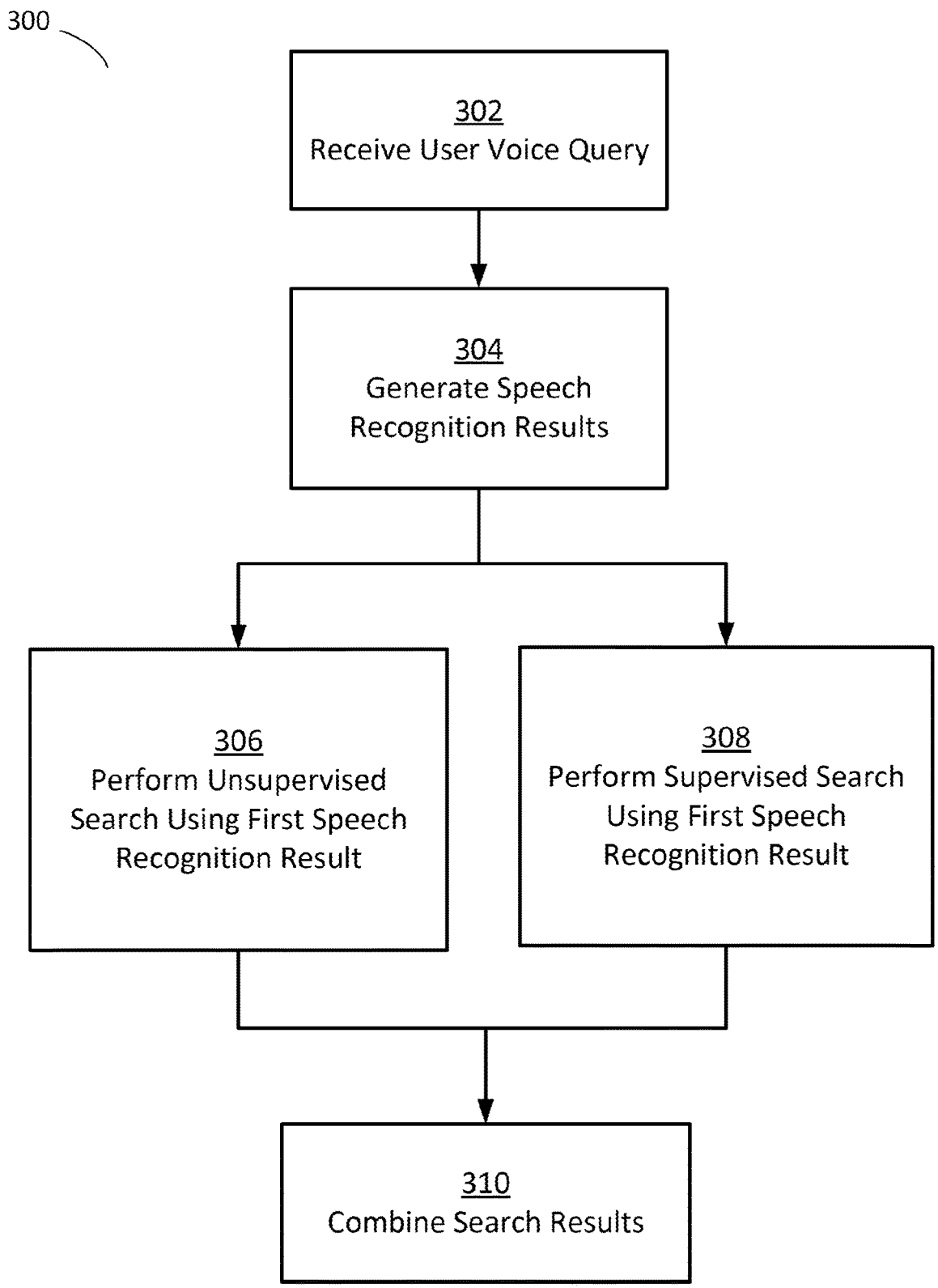
FIG. 3 is a flow chart of an illustrative process that performs both a supervised and an unsupervised search based on one or more speech recognition results, in accordance with some embodiments.

In accordance with some embodiments, a search query may be used to perform both supervised and unsupervised searches of a content repository. FIG. 3 is a flow chart of one non-limiting illustrative process 300 that performs both a supervised and an unsupervised search based on a speech recognition result. Search results generated by each type of search may subsequently be combined into a single set of search results. While the illustrative process in FIG. 3 is depicted as performing one unsupervised search and one supervised search using a first speech recognition result, it should be appreciated that any number of speech recognition results may similarly be used to perform additional supervised and unsupervised searches of content in the manner described below.

In act 302, a user voice query is received and in act 304, speech recognition results are generated based on the user voice query as described above in relation to acts 202 and 204, respectively, shown in FIG. 2.

In act 306, an unsupervised search of the content repository is performed using a first speech recognition result of the speech recognition results generated in act 304. Any suitable aspects of content stored in the content repository may be searched in the unsupervised search performed in act 306. For example, titles of articles stored in the content repository may be searched, and/or full text of articles stored in the content repository may be searched.

In some embodiments, only a portion of the content repository is searched by the unsupervised search. In some use cases, the portion of the content repository searched by the unsupervised search may be chosen to be the portion of the content other than the portion searched by the supervised search. For example, a content repository may include content in a problem/solution format in addition to other content (e.g., as illustrated in FIG. 1). The portion of the content repository chosen for searching by the unsupervised search in act 306 may be selected as the portion that excludes the content in the problem/solution format. This is merely one example, however, as aspects of the invention may be used to perform supervised and unsupervised searching of all or any portions of a content repository.

Search results produced by act 306 may be combined in act 310, described below, with search results produced in act 308 by a supervised search using the same query, in addition to any other search results produced (in act 306 and/or act 308) based on other queries.

In act 308, a supervised search of the content repository is performed using a first speech recognition result of the speech recognition results generated in act 304. The supervised search is performed using a classifier previously trained on training data that associates exemplary queries with corresponding articles from the content repository. As discussed above, the classifier for supervised classification may be trained to identify any amount of content from the content repository. The classifier may be used in act 308 to classify the first speech recognition result as being related to one or more articles of the content repository.

In some embodiments, the classifier is trained to classify inputs in a manner that identifies only a portion of the content repository. For example, a content repository may include content in a problem/solution format in addition to other content (e.g., as illustrated in FIG. 1). The portion of the content repository chosen for searching by the supervised search in act 308 may be selected to include the content in the problem/solution format. This is merely one example, however, as aspects of the invention may be used to perform supervised searching of all or any portions of a content repository.

Irrespective of how the content repository is searched, one or more search results may be produced by the supervised search. In some embodiments, the one or more search results have associated scores that indicate a predicted relevance of a corresponding search result. For example, a first search result may be judged to be more relevant to a search query than a second search result when the first search result is associated with a score higher than a score associated with the second search result. In some embodiments, one or more scores associated with one or more respective search results are normalized. For example, the one or more scores may be collectively scaled, translated and/or otherwise transformed by one or more mathematical operation(s). This may have a benefit of allowing an accurate comparison between other search results produced by unsupervised and/or supervised searches (which may result from the same query or a different query than the query used to produce the normalized search results).

In some embodiments, scores associated with one or more search results may be scaled based at least in part on a measure of entropy of the scores. As described below, scores associated with supervised search results may be compared with scores associated with unsupervised search results in order to combine the search results in act 310. However, scores alone produced by both types of searches may, in some use cases, not reflect the most accurate relevance rankings of the combined search results, even if both sets of scores have been normalized. For example, a supervised search based on a search query may produce search results that have low normalized confidence values. In such an illustrative situation, it is likely that none of the search results are relevant to the search query since they are produced via supervised classification and would be expected to produce higher values if the query were relevant to the content being searched. However, the same search query may produce comparable normalized confidence scores from an unsupervised search of the content, which may actually be more relevant than the similarly-scored supervised classification search results. Scaling of scores associated with search results based on a measure of entropy of the search results may more appropriately weight the search results so that their relevance may be more accurately compared.

In some embodiments, an entropy scaling factor is calculated for one or more search results such that the entropy is minimal when one score is much higher than other scores, and maximal when all scores have the same value. The entropy scaling factor may be multiplied with a score associated with a search result to produce an entropy weighted score. For example, an entropy scaling factor may be calculated as:

$$\text{Scaling Factor} = 1 - \sum_{r \in Search\ Results} \text{Score}(r) \log_N (\text{Score}(r))$$

where "Score" may be any score associated with a search result (e.g., a confidence score, a normalized confidence score, etc.) and N is the number of search results for which the entropy scaling factor is being calculated. In this example, each of the N scores may be multiplied by the scaling factor as defined by the above illustrative formula to determine entropy weighted scores. In general, however, any suitable entropy scaling factor may be applied as aspects of the invention described herein are not limited in this respect.

A suitable entropy scaling factor may be applied to any set of search results. For example, one or more search results output from a supervised search based on a search query may be entropy-weighted based on an entropy scaling factor calculated for the one or more search results. Alternatively, or additionally, one or more search results output from supervised searches based on a plurality of search queries may together be entropy-weighted based on an entropy scaling factor calculated for the one or more search results.

In some embodiments, search queries that are not relevant to content within the content repository may be identified. Such "out of domain" search queries may not produce search results that accurately represent information that a user wishes to obtain, and accordingly, it may be beneficial to identify either out of domain search queries, or search results resulting from an out of domain search query. In some embodiments, the classifier used in act 308 may be trained to recognize out of domain search queries by providing suitable examples during training. In some embodiments, an out of domain search query may be identified when all confidence scores associated with one or more search results produced based on the search query are below a threshold value. In some use cases, search results produced by out of domain search queries may be excluded from search results provided to a user.

As one non-limiting example of identifying an out of domain search query, the content repository may include content relating to the operation of a motor vehicle, and a user voice query may be "how do I close the trunk?" but one speech recognition result for the query may be "how do I nose the junk?" In this illustrative case, it may be beneficial to exclude search results resulting from a search for "how do I nose the junk?" since the most relevant content matches in the content repository are unlikely to be relevant to the information the user was attempting to identify. As discussed above, in some embodiments the query "how do I nose the junk?" may produce search results having confidence values all below a threshold value, which may identify the query as being out of domain, and which may cause these search results to be excluded. In some embodiments, the classifier may have been trained to identify out of domain search queries, and the classifier may classify the query "how do I nose the junk?" as an out of domain search query. In this case, the classifier may not identify any content as corresponding to the search query, and it may accordingly not be necessary to exclude search results as being produced by an out of domain search.

In act 310, search results produced by supervised and unsupervised searches performed in acts 306 and 308 may be combined. Search results may be combined using any suitable technique(s). In some embodiments, one or more scores (e.g., confidence values, normalized confidence values, entropy weighted confidence values and/or normalized entropy weighted confidence values) associated with the search results are used to produce a combined set of search results, such as by ordering the set of search results based at least in part on the one or more scores. For example, as discussed above, one or more search results produced by a supervised search in act 308 may be associated with respective confidence scores that may be normalized and entropy-weighted, and one or more search results produced by an unsupervised search in act 306 may be associated with respective confidence scores that may be normalized. A combined set of search results may be produced by collating all of these search results and ordering them by their respective confidence scores.

Figure 4:
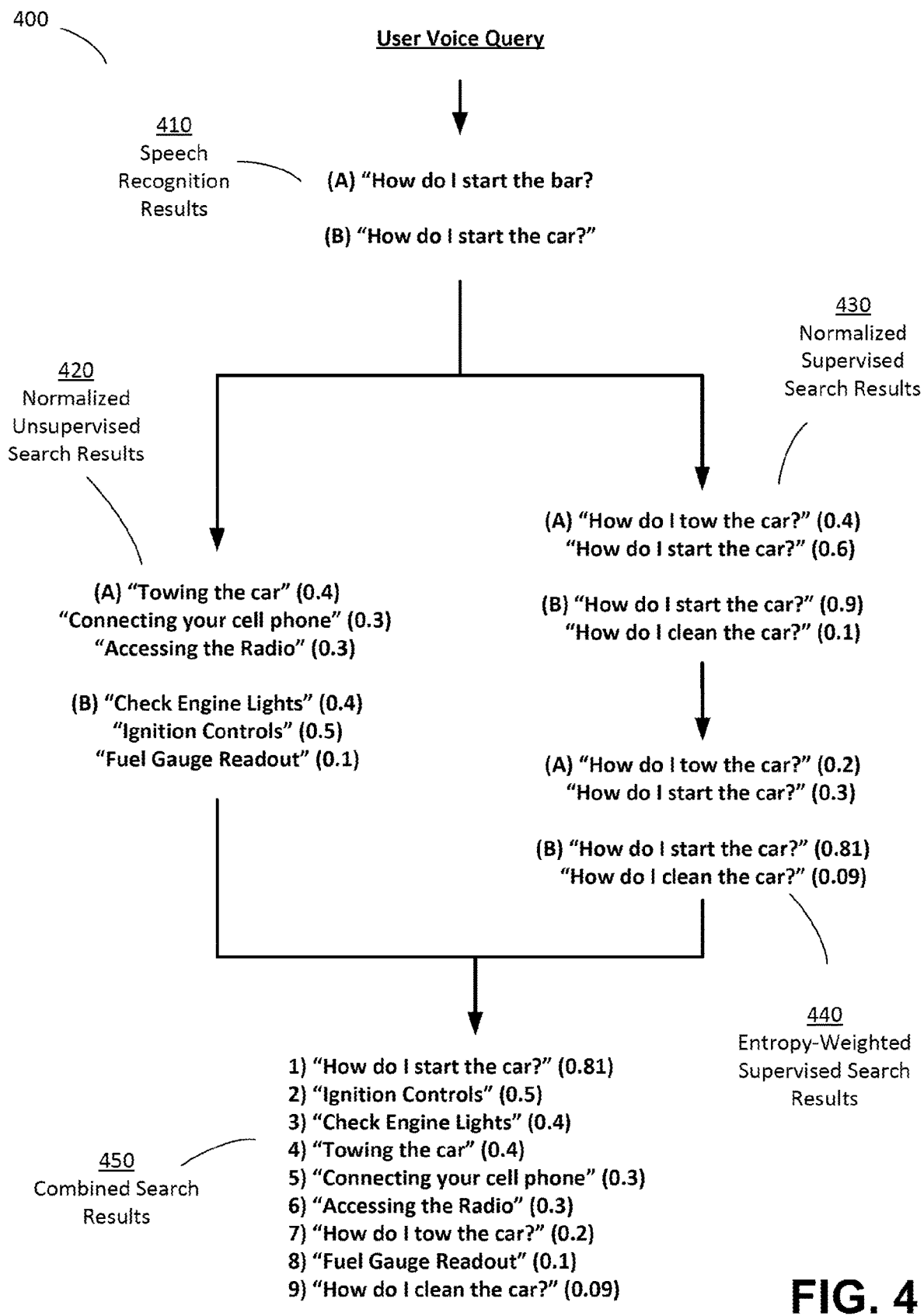
FIG. 4 depicts an illustrative process that searches for content in a content repository, in accordance with some embodiments.

FIG. 4 depicts an illustrative process of searching for content in a content repository in accordance with processes 200 and 300 shown in FIGS. 2 and 3, respectively. In the example of FIG. 4, a user is performing a search of a content repository that comprises content relating to operation of a motor vehicle. Process 400 receives a user voice query and generates two illustrative speech recognition results 410, labeled A and B. In the example of FIG. 4, the user said "How do I start the car?" which was correctly recognized in speech recognition result B but misrecognized in speech recognition result A. Illustrative process 400 performs an unsupervised search and a supervised search for each speech recognition result using any of the techniques described above.

Each of the two speech recognition results A and B is used as a search query for both an unsupervised and a supervised search. Speech recognition result A is used as a query to an unsupervised search and produces three search results from the content repository, and speech recognition result B is used as a query to an unsupervised search and also produces three search results from the content repository. Each of the search results is associated with a confidence score representing a predicted relevance of the corresponding search result. Scores for the two sets of search results are independently normalized so that the total of the scores for the search results corresponding to each speech recognition result totals one. The search results and normalized scores are shown in FIG. 4 as normalized unsupervised search results 420.

Speech recognition result A is used as a query for a supervised search and produces two search results from the content repository, and speech recognition result B is used as a query for a supervised search and produces two search results from the content repository. Each of the search results is associated with a confidence score representing a predicted relevance of the corresponding search result. Scores for the two sets of search results are independently normalized so that the total of the scores for the search results corresponding to each speech recognition result totals one. The search results and normalized scores are shown in FIG. 4 as normalized supervised search results 430.

In the example of FIG. 4, content for which a classifier used to classify search queries in act 308 includes articles in a problem/solution format (such as article 121 shown in FIG. 1). In illustrative process 400, normalized supervised search results 430 identify articles having content in this form, whereas normalized unsupervised search results 420 identifies articles comprising prose more typically found in a vehicle's owner's manual.

As described above, in some embodiments scores associated with search results may be entropy-weighted. In the example of FIG. 4, the normalized supervised search results 430 are entropy-weighted to produce entropy-weighted supervised search results 440 by multiplying each of the normalized supervised search results 430 with the same entropy scaling factor. Since the scores associated with the search results for speech recognition result B in normalized supervised search results 430 have highly different values, the entropy scaling factor determined is close to one; in the example of FIG. 4 the entropy scaling factor applied to these scores is 0.9. In contrast, since scores associated with the search results for speech recognition result A in normalized supervised search results 430 are somewhat similar, the entropy scaling factor determined is smaller; in the example of FIG. 4 the scaling factor applied to these scores is 0.5.

Search results 420 and 440 are combined to produce a combined set of search results 450. In the example of FIG. 4, the search results are sorted in descending order of the associated scores such that the problem/solution article "How do I start the car?" is considered the most relevant content match, followed by the article relating to "Ignition Controls," etc. Note that in the example of FIG. 4, a duplicate search result identifying the article "How do I start the car?" has been excluded from the combined search results. In illustrative process 400, the duplicate search result having the lower score value of 0.6 was excluded.

Figure 5:
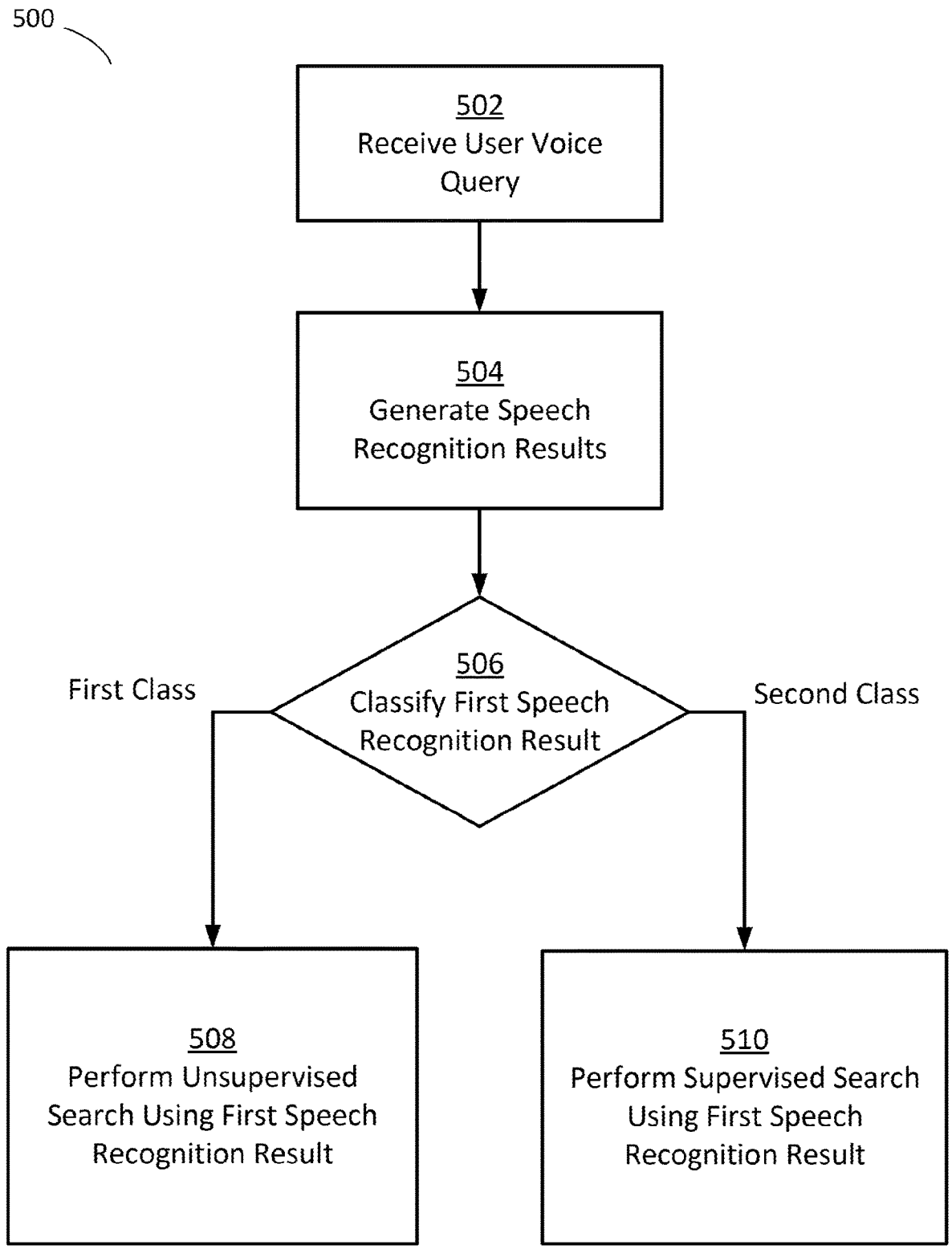
FIG. 5 is a flow chart of an illustrative process that performs either supervised or an unsupervised search based on one or more search queries, in accordance with some embodiments.

In accordance with some embodiments, a speech recognition result may be used to perform either supervised or unsupervised searches of a content repository. FIG. 5 is a flow chart of one non-limiting illustrative process 500 that performs either supervised or an unsupervised search based on a search query. Search results generated by each type of search and based on each speech recognition result may subsequently be combined into a single set of search results. While the illustrative process of FIG. 5 is depicted as performing either an unsupervised search or a supervised search using a first speech recognition result, it will be appreciated that any number of speech recognition results may similarly be used to perform additional supervised and/or unsupervised searches of content in the manner described below.

In act 502 a user voice query is received and in act 504, speech recognition results are generated based on the user voice query as described above in relation to acts 202 and 204, respectively, shown in FIG. 2.

In act 506, a first speech recognition result of the speech recognition results generated in act 504 is classified as corresponding to one of a plurality of classes that include a first class associated with an unsupervised search of the content repository and a second class associated with a supervised search of the content repository. As described above, using an additional classifier may reduce the number of unsupervised and/or supervised searches performed based on the speech recognition result by selecting one type of search or another based on the speech recognition result prior to performing a search.

The classifier used in act 506 to classify the first speech recognition result may have been trained on exemplary search queries and a corresponding indication of the class to which each query belongs. The exemplary queries may be written by a developer of the system, and/or may be generated and/or taken verbatim from content in the content repository. Which class the exemplary queries correspond to may depend on portions of content chosen for training the classifier for supervised searches of the content repository.

In some embodiments, the classifier used in act 506 identifies one or more speech recognition results as corresponding to out of domain search queries. As discussed above, out of domain search queries may not produce search results that accurately represent information that a user wishes to obtain, and accordingly it may be beneficial to identify either out of domain search queries, or search results resulting from an out of domain search query. While not shown in FIG. 5, process 500 may allow for rejection of out of domain search queries identified by the classifier used in act 506 without performing searches based on those search queries.

As a non-limiting illustrative use case for training a classifier, where content in a content repository includes articles in a problem/solution format, text of the "problem" portion of articles (e.g., "How do I start my car?") may be provided as exemplary queries to be associated with a supervised search class. Titles of articles not provided in the problem/solution format may be provided as exemplary queries to be associated with an unsupervised search class. Other content, including any content not included in the content repository, may be provided as exemplary queries to be considered out of domain. A subsequent query provided as input to the classifier may be identified as corresponding to one of these three classes (supervised, unsupervised, or out of domain).

When the first speech recognition result is classified in act 506 as corresponding to unsupervised searching, an unsupervised search using the first speech recognition result as a search query is performed in act 508. The unsupervised search performed in act 508 may be performed in any suitable way, including using any of the techniques described above in relation to act 306 shown in FIG. 3. When the first speech recognition result is classified in act 506 as corresponding to supervised searching, a supervised search using the first speech recognition result as a search query is performed in act 510. The supervised search performed in act 510 may be performed in any suitable way, including using any of the techniques described above in relation to act 308 shown in FIG. 3.

Figure 6:
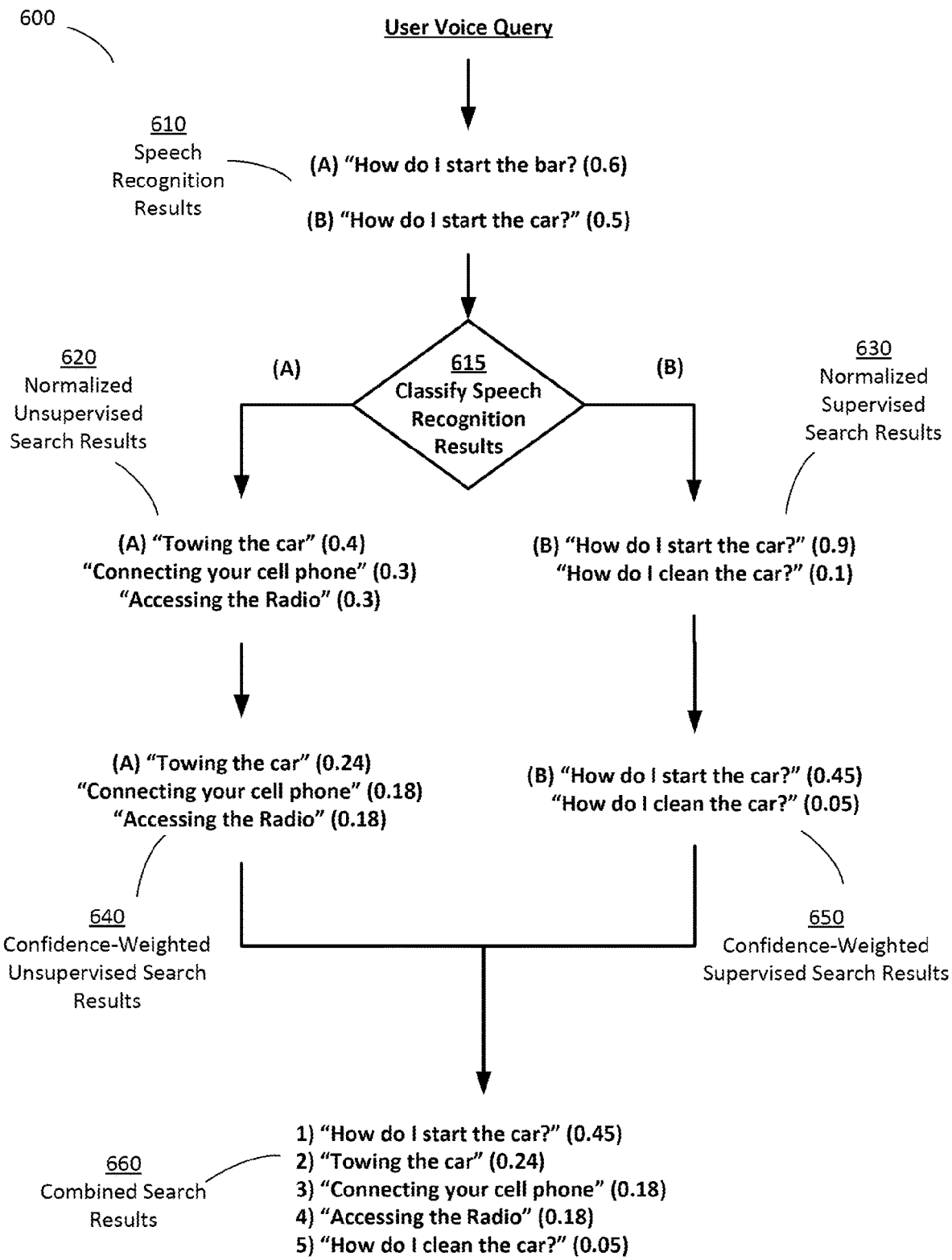
FIG. 6 depicts an illustrative process that searches for content in a content repository, in accordance with some embodiments.

FIG. 6 depicts an illustrative process of searching for content in a content repository in accordance with processes 200 and 500 shown in FIGS. 2 and 5, respectively. In the example of FIG. 6, a user is performing a search of a content repository that comprises content relating to operation of a motor vehicle. Process 600 receives a user voice query and generates two illustrative speech recognition results 610, labeled A and B. In the example of FIG. 6, the user said "How do I start the car?" which was correctly recognized in speech recognition result B but misrecognized in speech recognition result A. Illustrative process 600 performs an unsupervised search or a supervised search for each speech recognition result based on the output of a classifier, which can be done using any of the techniques described above. In the example of FIG. 6, speech recognition results A and B are shown with confidence values provided by speech recognition of 0.6 and 0.5, respectively.

Speech recognition results A and B are each used as a search query to either an unsupervised or a supervised search based on the output of a classifier 615. As discussed above, a trained classifier may determine which of a plurality of classes a query corresponds to, where the classes include a class associated with supervised searching and a class associated with unsupervised searching. In the example of FIG. 6, speech recognition result A is identified as corresponding to a class associated with unsupervised searching and speech recognition result is identified as corresponding to a class associated with supervised searching.

Speech recognition result A is used as a query to an unsupervised search and produces three search results from the content repository. Each of the search results is associated with a confidence score representing a predicted relevance of the corresponding search result. Scores for each set of search results (of which there is only one in the example of FIG. 4) are normalized (e.g., so that the total of the scores for the search results corresponding to each speech recognition result totals one). The search results and normalized scores are shown in FIG. 6 as normalized unsupervised search results 620.

Normalized unsupervised search results 620 are then weighted by the confidence value of the speech recognition result that was used to produce the search results, which in the example of FIG. 4 is a value of 0.6. This step produces confidence-weighted unsupervised search results 640.

Speech recognition result B is used as a query to a supervised search and produces three search results from the content repository. Each of the search results is associated with a confidence score representing a predicted relevance of the corresponding search result. Scores for each set of search results (of which there is only one in the example of FIG. 4) are normalized (e.g., so that the total of the scores for the search results corresponding to each speech recognition result totals one). The search results and normalized scores are shown in FIG. 6 as normalized supervised search results 630.

Normalized supervised search results 630 are then weighted by the confidence value of the speech recognition result that was used to produce the search results, which in the example of FIG. 4 is a value of 0.5. This step produces confidence-weighted supervised search results 650.

Search results 640 and 650 are combined to produce a combined set of search results 660. In the example of FIG. 6, the search results are sorted in descending order of the associated scores such that the problem/solution article "How do I start the car?" is considered the most relevant content match, followed by the article relating to "Towing the car," followed by "Connecting your cell phone," "Accessing the Radio," and "How do I clean the car?" in that order.

Figure 7:
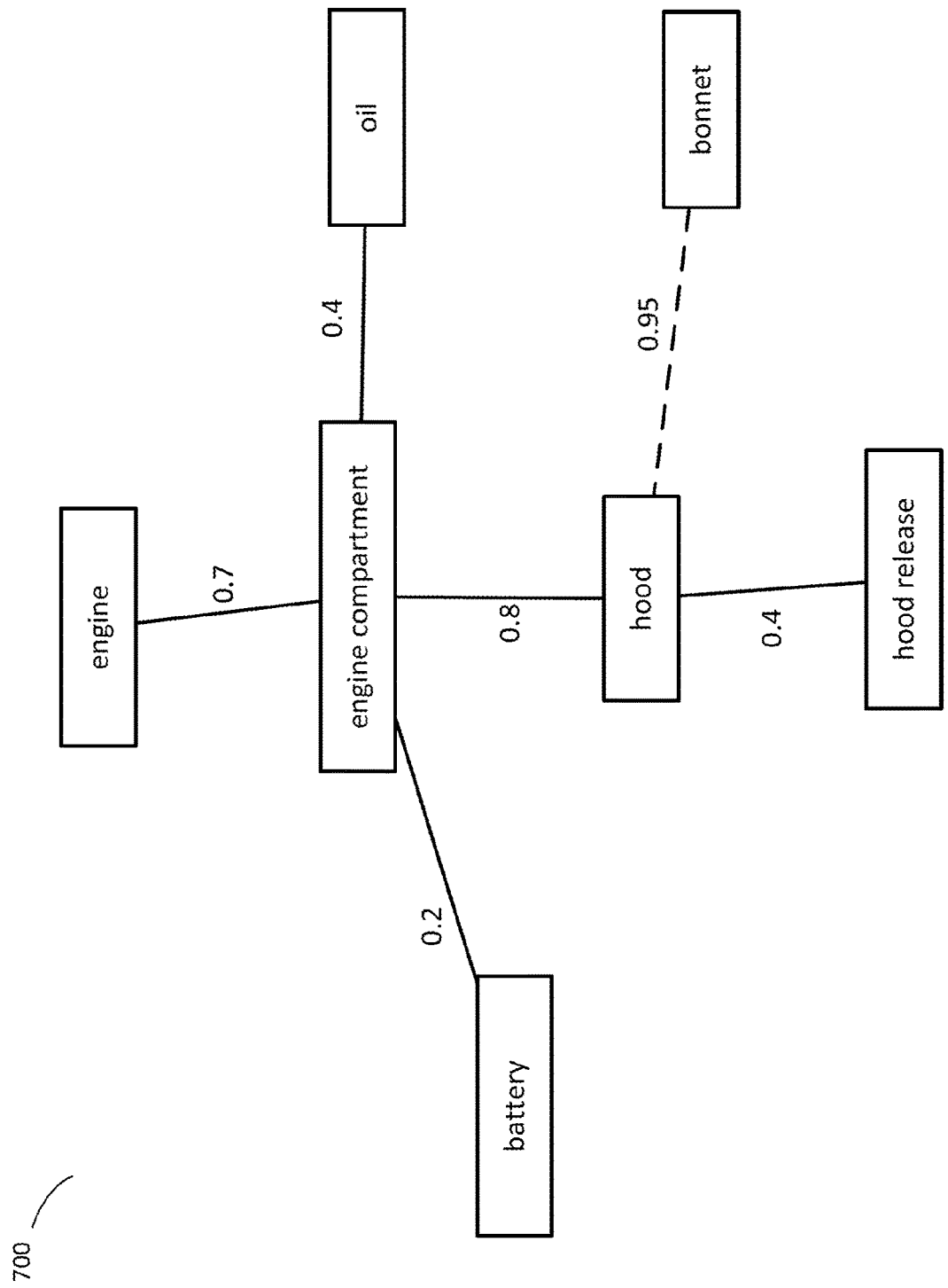
FIG. 7 depicts an illustrative ontology that may be used to supplement search queries for either supervised or an unsupervised searches, in accordance with some embodiments.

According to some embodiments, and as discussed above, one or more words in a search query (e.g., a speech recognition result) may be identified in an ontology and used to supplement a search query. FIG. 7 illustrates a portion of illustrative ontology 700 which relates to an automobile. Connections between related elements are shown as solid lines in FIG. 7, whereas connections between synonyms are shown as dashed lines. Connections between elements in the ontology represent a conceptual similarity between the elements. Weights associated with each connection, described further below, are shown adjacent to the connecting lines and may identify a strength of the conceptual similarity between connected elements.

The embodiments that employ an ontology can use any type of ontology, and ontologies created in any way, as the techniques described herein are not limited in this respect. In some embodiments, an ontology such as ontology 700 may, in whole or in part, have been generated automatically. Any content within a content repository or related to content within a content repository, such as an index, collection of article titles or headlines, and/or a table of contents may be used to generate an ontology such as ontology 700. Alternatively, or additionally, an ontology may, in whole or in part, be generated based on groupings and/or hierarchies found in a publically available ontology (such as "ConceptNet").

Mappings between elements in an ontology, as shown in the illustrative ontology of FIG. 7 by lines connecting the elements, may be associated with one or more weights which represent a level of similarity between the elements.

In some use cases, synonyms may be connected via higher weight values than is typical for non-synonym connections between elements since elements that are synonyms refer to the same concept. Weight values associated with connections between elements in illustrative ontology 700 are shown alongside the lines connecting the elements in FIG. 7.

When performing an unsupervised search of content using any of the techniques and/or process described above, a search query may be supplemented with additional information by identifying one or more elements in an ontology that correspond to one or more words in the search query. For example, a search query "How do I open the hood" might be supplemented with "engine compartment" and "bonnet" by identifying the element "hood" in ontology 700 and identifying these elements as being related to "hood" based on the ontology.

In some embodiments, an unsupervised search is performed using a search query by adding elements identified as related to one or more words in the search query to the search query. An unsupervised search may therefore search, using the above example, using a query "How do I open the hood engine compartment bonnet." In some embodiments, words added to the search query as described above for an unsupervised search are weighted based on the connections to the identified element in the ontology. For example, using the above unsupervised search all words may have a weight of 1 except for "engine compartment" which has a weight of 0.8 and "bonnet" which has a weight of 0.95. However, in general an unsupervised search may be enhanced based on identification of one or more words in the search as elements in an ontology using any suitable technique, as aspects of the invention described herein are not limited in this respect.

In some embodiments, a supervised search is performed using a search query that is supplemented by one or more elements of an ontology. The search query provided to a classifier for a supervised search may be supplemented in any suitable way. In some use cases, a feature vector supplied to the classifier may include one or more additional features that encode the presence of a specific related concept. For example, a feature vector may include a feature for "hood" and an additional feature for the related "engine compartment" concept. This additional feature may be provided over and above a feature for "engine compartment" in the feature vector, thereby allowing the "engine compartment" phrase to be treated differently when it is part of a search query than when "engine compartment" is identified as a concept related to one or more words in a query (such as "hood"). A search query may thereby be expanded by adding features to related concepts, as identified by an ontology, to the feature vector used as input to the classifier.

In some embodiments, feature vector expansion is performed during training of the classifier. Training data may include one or more exemplary search queries that comprise a word or phrase, in addition to one or more exemplary search queries that identify a concept related to that word or phrase (e.g., via an ontology). This may allow the classifier to be trained to distinguish (e.g., to provide different classification results) between a concept when it is provided in a search query and when the same concept is identified by expanding a search query using related concepts identified in the ontology.

For example, the word "mist" may be provided in one or more exemplary search queries during training as relating to the function of an automobile for applying water to the windshield. In addition, the word "fog" may be provided in one or more exemplary search queries during training as relating to the fog light function of an automobile. The words "fog" and "mist" may also be related in an ontology. If, during training of the classifier, the search queries comprising the word "mist" were treated identically to search queries supplemented with "mist" (e.g., by recognizing the association in the ontology between "fog" and "mist"), the fog light and water application functions of the automobile may be conflated by the classifier, resulting in reduced accuracy in classifying queries relating to those functions of the automobile (e.g., the search queries "where is the fog button?" and "where is the mist button?" might be classified as similar, or identical, queries). By training the classifier to distinguish between a concept when it is provided in the search query and when the concept is identified based on an ontology, the classifier may be more accurately trained when queries are expanded based on an ontology. As discussed above, in some embodiments this may comprise providing different features in a feature vector for a word or phrase when it is provided in a search query than for when the word or phrase is identified based on an ontology.

Figure 8:
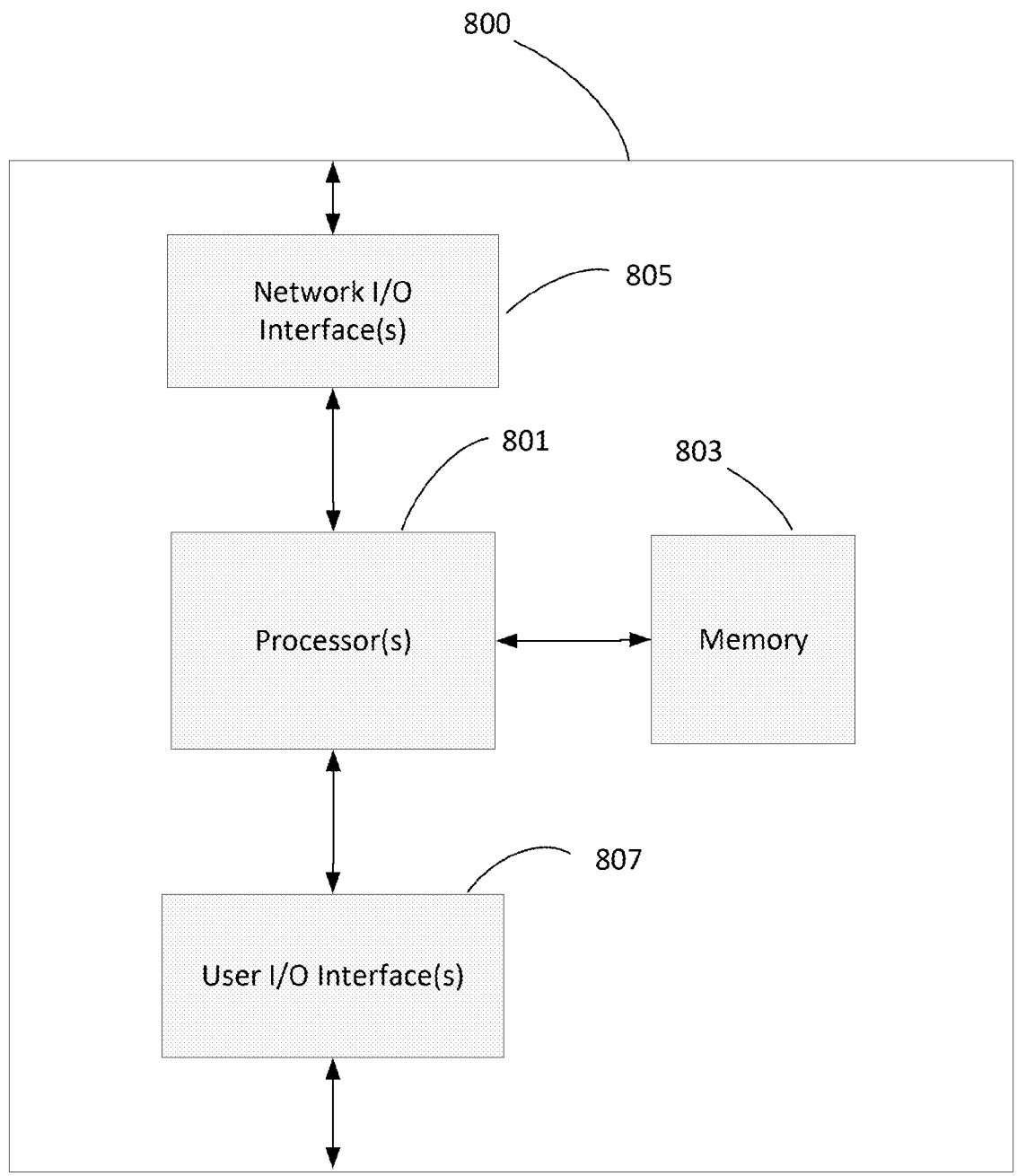
FIG. 8 illustrates an example of a computing system environment on which aspects of the invention may be implemented.

FIG. 8 is a block diagram of an illustrative computing device 800 that may be used to implement any of the above-described techniques. Computing device 800 may include one or more processors 801 and one or more tangible, non-transitory computer-readable storage media (e.g., memory 803). Memory 803 may store, in a tangible non-transitory computer-recordable medium, computer program instructions that implement any of the above-described functionality. Processor(s) 801 may be coupled to memory 803 and may execute such computer program instructions to cause the functionality to be realized and performed.

Computing device 800 may also include a network input/output (I/O) interface 805 via which the computing device may communicate with other computers (e.g., over a network), and may also include one or more user I/O interfaces 807, via which the computer may provide output to and receive input from a user. The user I/O interfaces may include devices such as a keyboard, a mouse, a microphone, a display device (e.g., a monitor or touch screen), speakers, a camera, and/or various other types of I/O devices.

The above-described embodiments of the present disclosure can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed using microcode or software to perform the functions recited above.

In this respect, it should be appreciated that one implementation of embodiments of the present disclosure comprises at least one computer-readable storage medium (i.e., a tangible, non-transitory computer-readable medium, such as a computer memory, a floppy disk, a compact disk, a magnetic tape, or other tangible, non-transitory computer-readable medium) encoded with a computer program (i.e., a plurality of instructions), which, when executed on one or more processors, performs above-discussed functions of embodiments of the present disclosure. The computer-readable storage medium can be transportable such that the program stored thereon can be loaded onto any computer resource to implement aspects of the present disclosure discussed herein. In addition, it should be appreciated that the reference to a computer program which, when executed, performs any of the above-discussed functions, is not limited to an application program running on a host computer. Rather, the term "computer program" is used herein in a generic sense to reference any type of computer code (e.g., software or microcode) that can be employed to program one or more processors to implement above-discussed aspects of the present disclosure.

The phraseology and terminology used herein is for the purpose of description and should not be regarded as limiting. The use of "including," "comprising," "having," "containing", "involving", and variations thereof, is meant to encompass the items listed thereafter and additional items. Use of ordinal terms such as "first," "second," "third," etc., in the claims to modify a claim element does not by itself connote any priority, precedence, or order of one claim element over another or the temporal order in which acts of a process are performed. Ordinal terms are used merely as labels to distinguish one claim element having a certain name from another element having a same name (but for use of the ordinal term), to distinguish the claim elements from each other.

Having described several embodiments of the disclosure in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. A method of searching for content in at least one content repository in response to a user voice query, the method comprising acts of:
    receiving the user voice query;
    performing speech recognition on the user voice query to generate N best speech recognition results for the user voice query, wherein N is equal to one or more, and wherein the N best speech recognition results comprise a first speech recognition result;
    performing a supervised search of the at least one content repository to identify a set of one or more supervised search results, wherein each one of the one or more supervised search results is associated with a score indicative of a predicted relevance of the one of the one or more supervised search results to the user voice query, wherein performing the supervised search comprises processing the first speech recognition result using one or more classifiers that classify the first speech recognition result into at least one class that identifies previously classified content in the at least one content repository;
    performing an unsupervised search of the at least one content repository to identify a set of one or more unsupervised search results, wherein each one of the one or more unsupervised search results is associated with a score indicative of a predicted relevance of the one of the one or more unsupervised search results to the user voice query, wherein performing the unsupervised search comprises performing a word search of the at least one content repository using one or more words derived from the first speech recognition result; and
    generating a set of combined results from among the set of one or more supervised search results and the set of one or more unsupervised search results based at least in part on the scores of the supervised search results and the scores of the unsupervised search results.

2. The method of claim 1, wherein the generating comprises evaluating the scores of the supervised search results and the scores of the unsupervised search results, and selecting for the combined results those search results that have scores indicative of the highest relevance among the supervised and unsupervised search results.

3. The method of claim 1, wherein the generating comprises including in the combined search results at least one result from the set of one or more unsupervised results and at least one result from the set of one or more supervised results.

4. The method of claim 1, further comprising identifying one or more elements of an ontology as related to one or more words of the first speech recognition result, and wherein the performing the unsupervised search and/or the performing the supervised search is based at least in part on the identified one or more elements.

5. The method of claim 1, further comprising entropy-weighting the scores of the supervised search results to generate entropy-weighted supervised search results, and wherein generating the set of combined results comprises selecting from among the entropy-weighting supervised search results.

6. The method of claim 1, further comprising presenting at least a portion of the set of combined results to a user using speech synthesis.

7. The method of claim 1, wherein the content repository comprises content describing operation of a motor vehicle.

8. An apparatus comprising:
    at least one processor; and
    at least one storage medium storing processor-executable instructions that, when executed by the at least one processor, perform a method of searching for content in at least one content repository in response to a user voice query, the method comprising acts of:
        receiving the user voice query;
        performing speech recognition on the user voice query to generate N best speech recognition results for the user voice query, wherein N is equal to one or more, and wherein the N best speech recognition results comprise a first speech recognition result;
        performing a supervised search of the at least one content repository to identify a set of one or more supervised search results, wherein each one of the one or more supervised search results is associated with a score indicative of a predicted relevance of the one of the one or more supervised search results to the user voice query, wherein performing the supervised search comprises processing the first speech recognition result using one or more classifiers that classify the first speech recognition result into at least one class that identifies previously classified content in the at least one content repository;
        performing an unsupervised search of the at least one content repository to identify a set of one or more unsupervised search results, wherein each one of the one or more unsupervised search results is associated with a score indicative of a predicted relevance of the one of the one or more unsupervised search results to the user voice query, wherein performing the unsupervised search comprises performing a word search of the at least one content repository using one or more words derived from the first speech recognition result; and generating a set of combined results from among the set of one or more supervised search results and the set of one or more unsupervised search results based at least in part on the scores of the supervised search results and the scores of the unsupervised search results.

9. The apparatus of claim 8, wherein the generating comprises evaluating the scores of the supervised search results and the scores of the unsupervised search results, and selecting for the combined results those search results that have scores indicative of the highest relevance among the supervised and unsupervised search results.

10. The apparatus of claim 8, wherein the generating comprises including in the combined search results at least one result from the set of one or more unsupervised results and at least one result from the set of one or more supervised results.

11. The apparatus of claim 8, wherein the method further comprises identifying one or more elements of an ontology as related to one or more words of the first speech recognition result, and wherein the performing the unsupervised search and/or the performing the supervised search is based at least in part on the identified one or more elements.

12. The apparatus of claim 8, wherein the method further comprises entropy-weighting the scores of the supervised search results to generate entropy-weighted supervised search results, and wherein generating the set of combined results comprises selecting from among the entropy-weighting supervised search results.

13. The apparatus of claim 8, wherein the method further comprises presenting at least a portion of the set of combined results to a user using speech synthesis.

14. The apparatus of claim 8, wherein the content repository comprises content describing operation of a motor vehicle.

15. At least one computer-readable storage medium storing computer-executable instructions that, when executed, perform a method of searching for content in at least one content repository in response to a user voice query, the method comprising acts of:

receiving the user voice query;

performing speech recognition on the user voice query to generate N best speech recognition results for the user voice query, wherein N is equal to one or more, and wherein the N best speech recognition results comprise a first speech recognition result;

performing a supervised search of the at least one content repository to identify a set of one or more supervised search results, wherein each one of the one or more supervised search results is associated with a score indicative of a predicted relevance of the one of the one or more supervised search results to the user voice query, wherein performing the supervised search comprises processing the first speech recognition result using one or more classifiers that classify the first speech recognition result into at least one class that identifies previously classified content in the at least one content repository;

performing an unsupervised search of the at least one content repository to identify a set of one or more unsupervised search results, wherein each one of the one or more unsupervised search results is associated with a score indicative of a predicted relevance of the one of the one or more unsupervised search results to the user voice query, wherein performing the unsupervised search comprises performing a word search of the at least one content repository using one or more words derived from the first speech recognition result; and generating a set of combined results from among the set of one or more supervised search results and the set of one or more unsupervised search results based at least in part on the scores of the supervised search results and the scores of the unsupervised search results.

16. The at least one computer-readable storage medium of claim 15, wherein the generating comprises evaluating the scores of the supervised and unsupervised search results and selecting for the combined results those search results that have scores indicative of the highest relevance among the supervised and unsupervised search results.

17. The at least one computer-readable storage medium of claim 15, wherein the generating comprises including in the combined search results at least one result from the set of one or more unsupervised results and at least one result from the set of one or more supervised results.

18. The at least one computer-readable storage medium of claim 15, wherein the method further comprises identifying one or more elements of an ontology as related to one or more words of the first speech recognition result and performing the unsupervised search or the supervised search based at least in part on the identified one or more elements.

19. The at least one computer-readable storage medium of claim 15, wherein the method further comprises entropy-weighting the scores of the supervised search results prior to generating the set of combined results.

20. The at least one computer-readable storage medium of claim 15, wherein the method further comprises presenting at least a portion of the set of combined results using speech synthesis.

\* \* \* \* \*